US012326694B2

(12) United States Patent
Hernandez et al.

(10) Patent No.: US 12,326,694 B2
(45) Date of Patent: Jun. 10, 2025

(54) ELASTIC RETAINING MEMBER FOR ATTACHING A TIMEPIECE COMPONENT TO A SUPPORT ELEMENT

(71) Applicant: Nivarox-FAR S.A., Le Locle (CH)

(72) Inventors: Ivan Hernandez, Cressier (CH); Pierre Cusin, Villars-Burquin (CH)

(73) Assignee: Nivarox-FAR S.A., Le Locle (CH)

( * ) Notice: Subject to any disclaimer, the term of this patent is extended or adjusted under 35 U.S.C. 154(b) by 656 days.

(21) Appl. No.: 17/276,429

(22) PCT Filed: Aug. 28, 2019

(86) PCT No.: PCT/EP2019/072968

§ 371 (c)(1),
(2) Date: Mar. 15, 2021

(87) PCT Pub. No.: WO2020/057919

PCT Pub. Date: Mar. 26, 2020

(65) Prior Publication Data

US 2022/0075318 A1 Mar. 10, 2022

(30) Foreign Application Priority Data

Sep. 21, 2018 (EP) .................................... 18196016

(51) Int. Cl.
*G04B 17/34* (2006.01)

(52) U.S. Cl.
CPC .................................. *G04B 17/34* (2013.01)

(58) Field of Classification Search
CPC ..... G04B 17/34; G04B 13/022; G04B 17/345
(Continued)

(56) References Cited

U.S. PATENT DOCUMENTS

2009/0135679 A1* 5/2009 Musy .................. G04B 43/002 368/177
2013/0047437 A1* 2/2013 Daout .................. G04B 17/345 403/345
(Continued)

FOREIGN PATENT DOCUMENTS

CH 698 794 B1 10/2009
CH 702 931 A2 10/2011
(Continued)

OTHER PUBLICATIONS

Japanese Office Action issued Mar. 1, 2022 in Japanese Patent Application No. 2021-538899 (with English translation), 6 pages.
(Continued)

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

An elastic retaining member for attaching a timepiece component to a support element, includes an opening into which the support element is likely to be inserted, the retaining member includes rigid arms and elastic arms defined between connecting zones helping to ensure elastic clamping of the support element in the opening the rigid arms being provided with the only contact zones of the retaining member with the support element and in that, the rigid or elastic arms each extend longitudinally between connecting zones, the rigid arms and the elastic arms being arranged in the retaining member successively and alternately and each rigid arm has a volume of material greater than the volume of material constituting each elastic arm.

21 Claims, 2 Drawing Sheets

(58) Field of Classification Search
USPC .......................................................... 368/177
See application file for complete search history.

(56) References Cited

U.S. PATENT DOCUMENTS

| | | | | |
|---|---|---|---|---|
| 2015/0023140 | A1* | 1/2015 | Daout .................... | G04B 1/145 368/177 |
| 2016/0370764 | A1 | 12/2016 | Cusin et al. | |
| 2018/0107162 | A1* | 4/2018 | Hernandez ........... | G04B 17/345 |
| 2018/0150029 | A1 | 5/2018 | Shibuya et al. | |

FOREIGN PATENT DOCUMENTS

| | | | | |
|---|---|---|---|---|
| CH | 706526 | A2 * | 11/2013 | ............. G04B 17/32 |
| CH | 707 288 | A1 | 5/2014 | |
| CN | 101375218 | A | 2/2009 | |
| CN | 107942639 | A | 4/2018 | |
| EP | 1 857 891 | A1 | 11/2007 | |
| EP | 2219083 | A1 * | 8/2010 | ........... G04B 13/021 |
| EP | 2 372 473 | A2 | 10/2011 | |
| EP | 2 889 701 | A2 | 7/2015 | |
| EP | 3 106 931 | A1 | 12/2016 | |
| EP | 3 309 625 | A1 | 4/2018 | |
| EP | 3 327 514 | A2 | 5/2018 | |
| JP | 2013-234901 | A | 11/2013 | |
| JP | 2014-528572 | A | 10/2014 | |
| JP | 2018-63250 | A | 4/2018 | |
| JP | 2018-87736 | A | 6/2018 | |
| WO | WO 2007/132306 | A2 | 11/2007 | |
| WO | WO 2011/026725 | A1 | 3/2011 | |
| WO | WO 2013/045706 | A2 | 4/2013 | |
| WO | WO 2017/163148 | A1 | 9/2017 | |

OTHER PUBLICATIONS

Indian Office Action issued Jun. 8, 2021 in Indian Patent Application No. 202147011476 (with English translation).

Japanese Office Action issued Aug. 2, 2022 in Japanese Patent Application No. 2021-538899 (with unedited computer generated English Translation), 7 pages.

International Search Report issued Nov. 4, 2019 in PCT/EP2019/072968 filed Aug. 28, 2019, 3 pages.

International Preliminary Report on Patentability issued Jan. 13, 2021 in PCT/EP2019/072968 filed Aug. 28, 2019, 6 pages (with Translation of Category of cited Documents).

Combined Chinese Office Action and Search Report issued Aug. 25, 2021 in corresponding Chinese Patent Application No. 201980061894.6 (with English Translation and English Translation of Category of Cited Documents),17 pages.

* cited by examiner

ELASTIC RETAINING MEMBER FOR ATTACHING A TIMEPIECE COMPONENT TO A SUPPORT ELEMENT

CROSS-REFERENCE TO RELATED APPLICATIONS

This application is a 371 of International Application No. PCT/EP2019/072968 filed Aug. 28, 2019 and claims the benefit of priority from prior European Application No. 18196016.2 filed Sep. 21, 2018, the entire contents of each of which are incorporated herein in their entirety.

FIELD OF THE INVENTION

The invention relates to an elastic retaining member for attaching a timepiece component to a support element.

The invention also relates to an elastic retaining member-timepiece component unit and an assembly of such a unit with the support element.

The invention likewise relates to a method for producing such an assembly.

In addition, the invention relates to a horological movement comprising at least one such assembly.

Finally, the invention relates to a timepiece comprising such a movement.

BACKGROUND OF THE INVENTION

In the prior art, it is known elastic retaining members such as horological collets that contribute to assemblies of balance-springs on balance staffs in a horological movement and this, by elastic clamping.

However, such elastic retaining members have the major drawback of imposing within the scope of producing such assemblies complex, long and expensive mounting operations due to the fact that these members have resistance torques on these balance shafts that are low and limited.

SUMMARY OF THE INVENTION

The aim of the present invention is to overcome all or part of the previously mentioned drawbacks by proposing an elastic retaining member that has a significant resistance torque particularly in order to facilitate/simplify the mounting operations for an assembly of an elastic retaining member-timepiece component unit with a support element.

To this end, the invention relates to an elastic retaining member for attaching a timepiece component to a support element, comprising an opening into which said support element is likely to be inserted, the retaining member comprising rigid arms and elastic arms defined between connecting zones helping to ensure elastic clamping of the support element in the opening the rigid arms being provided with the only contact zones of the retaining member with the support element and in that, said rigid or elastic arms each extend longitudinally between connecting zones, these rigid arms and these elastic arms being arranged in the retaining member successively and alternately and each rigid arm has a volume of material greater than the volume of material constituting each elastic arm.

Thus, thanks to these features, the elastic retaining member is then capable of storing a large amount of elastic energy when it is constrained in order to return a significant resistance torque permitting elastic clamping and this, particularly thanks to a significant rigidity of this elastic retaining member induced particularly by consequent volumes (or quantities) of material constituting the rigid arms thereof that comprise the inner and outer structures. It will be noted that these significant volumes of material are more specifically included in the contact zones that are placed under load (or under stress) during the insertion of the support element into this retaining member.

In addition, it will be seen that this elastic retaining member is configured so that this elastic energy storage remains within the permissible stress values with regards to the material that constitutes such a retaining member such as silicon.

In other embodiments:

- the retaining member comprises an outer structure likely to be connected to said timepiece component and an inner structure defining an opening into which the support element is likely to be inserted, said retaining member comprising the rigid arms and the elastic arms interconnecting the outer and inner structures these said rigid arms being interconnected by said elastic arms.
- the elastic retaining member comprises as many rigid arms as elastic arms;
- each rigid arm is connected in the two opposite ends thereof to two different elastic arms;
- each elastic arm has a transverse section that is smaller than a transverse section of each rigid arm;
- each elastic arm has a transverse section that is constant in the entire body of this elastic arm;
- the outer and inner structures respectively comprise outer and inner peripheral walls of said retaining member;
- the outer and inner peripheral walls are separated from one another according to a variable gap;
- said gap is a maximum gap when it is defined between portions of outer and inner peripheral walls included in the rigid arms.
- said gap is a maximum gap when it is defined between portions of the outer peripheral wall and the contact zones defined in the inner peripheral wall included in the rigid arms.
- said gap is a minimum gap when it is defined between portions of outer and inner peripheral walls included in the elastic arms;
- the outer and inner structures have different shapes;
- the elastic retaining member comprises an attachment point with the timepiece component;
- the elastic retaining member is a collet for attaching the timepiece component such as a balance-spring to a support element such as a balance staff;
- the elastic retaining member is made of a silicon-based material.

The invention also relates to an elastic retaining member-timepiece component unit for a horological movement of a timepiece comprising such a retaining member.

Advantageously, the unit is one piece.

The invention likewise relates to an assembly for a horological movement of a timepiece comprising such an elastic retaining member-timepiece component unit attached to a support element.

Furthermore, the invention relates to a method for producing an assembly of the elastic retaining member-timepiece component unit with a support element, comprising:

- a step of inserting the support element into the opening of the elastic retaining member of said unit, said step comprising a sub-step of elastically deforming the elastic retaining member provided with a phase for moving the rigid arms of the elastic retaining member inducing a double elastic deformation of the elastic arms of this elastic retaining member, and a step of attaching the retaining member to the support element comprising a sub-step of applying by the rigid arms of the elastic retaining member a resistance torque on said support element.

The invention also relates to a horological movement comprising at least one such assembly.

The invention likewise relates to a timepiece comprising such a horological movement.

SUMMARY DESCRIPTION OF THE DRAWINGS

Other specific features and advantages will become clearly apparent from the following description made hereafter, by way of indicative and non-limiting example, with reference to the appended drawings, wherein.

DETAILED DESCRIPTION OF PREFERRED EMBODIMENTS

Figure 1:
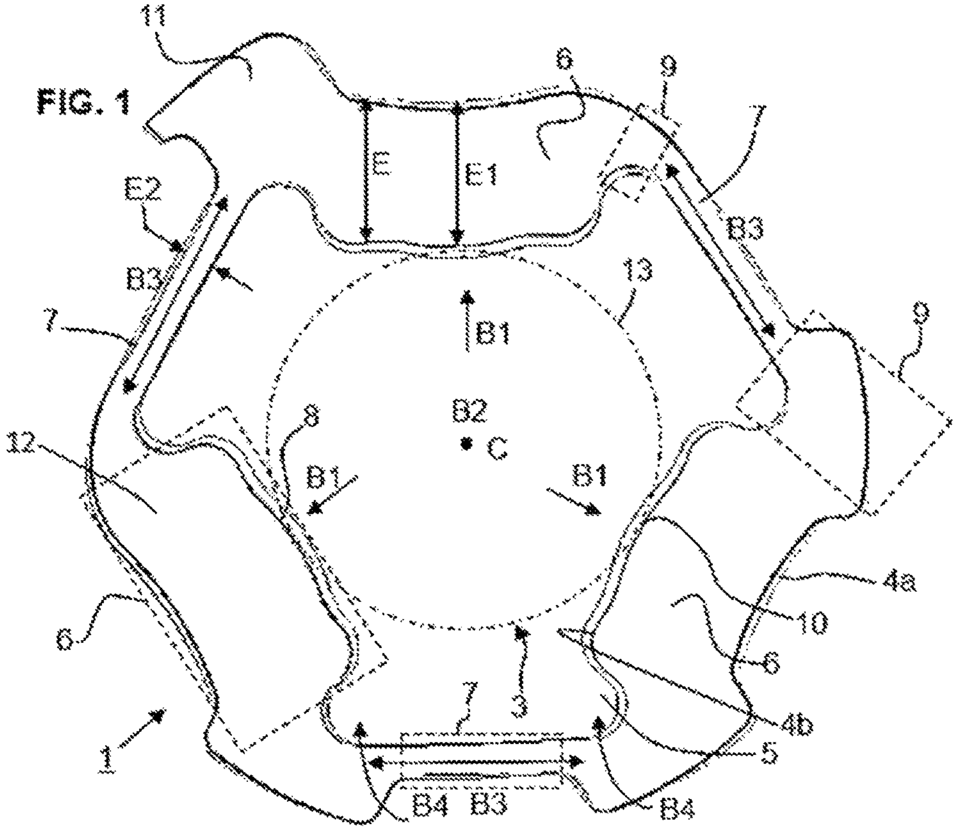
FIG. 1 is a sectional view of an elastic retaining member for attaching a timepiece component to a support element that is here in a constrained state, according to one embodiment of the invention.
Figure 2:
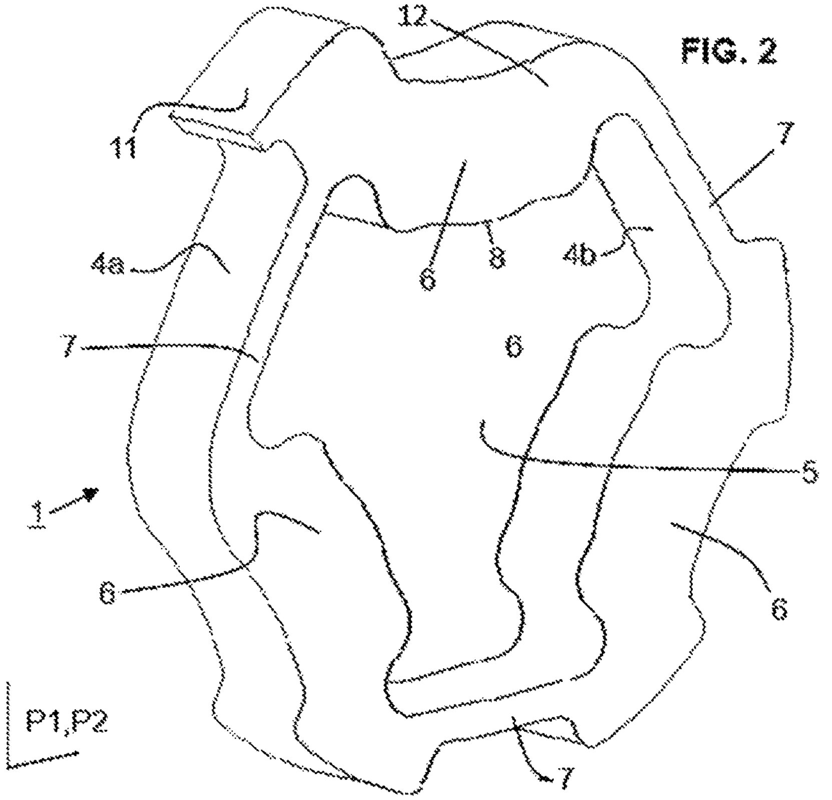
FIGS. 2 and 3 are perspective views of the elastic retaining member for attaching the timepiece component to the support element that are here in a resting state, according to the embodiment of the invention.
Figure 3:
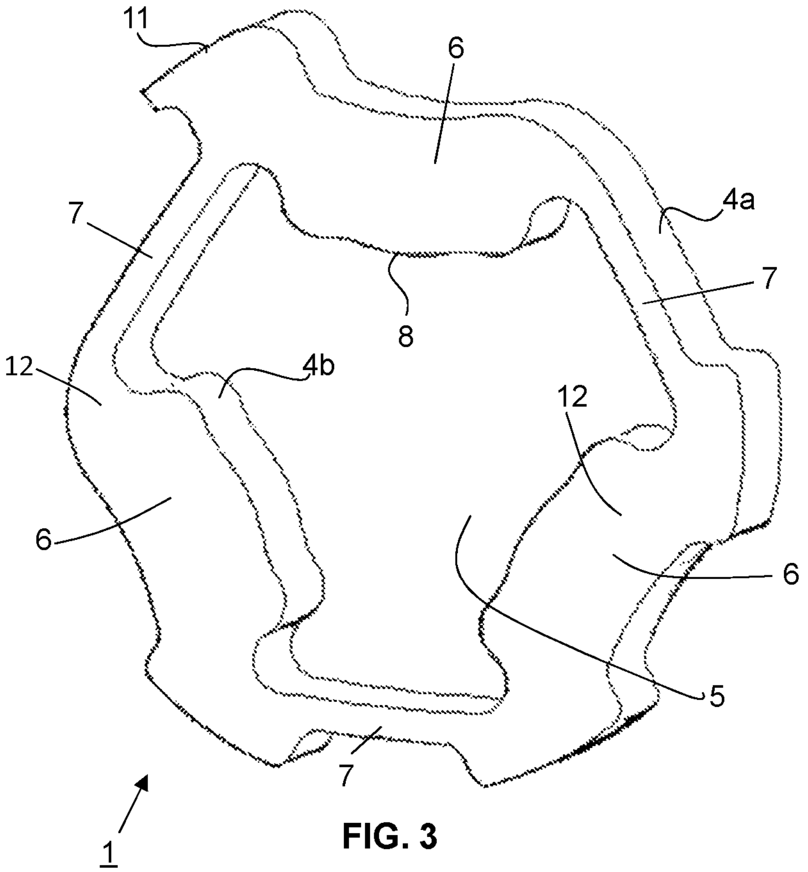

FIGS. 1 to 3 show one embodiment of the elastic retaining member 1 for attaching a timepiece component 2 to a support element 3. By way of example, the elastic retaining member 1 may be a collet for attaching the timepiece component 2 such as a balance-spring to a support element 3 such as a balance staff.

Figure 4:
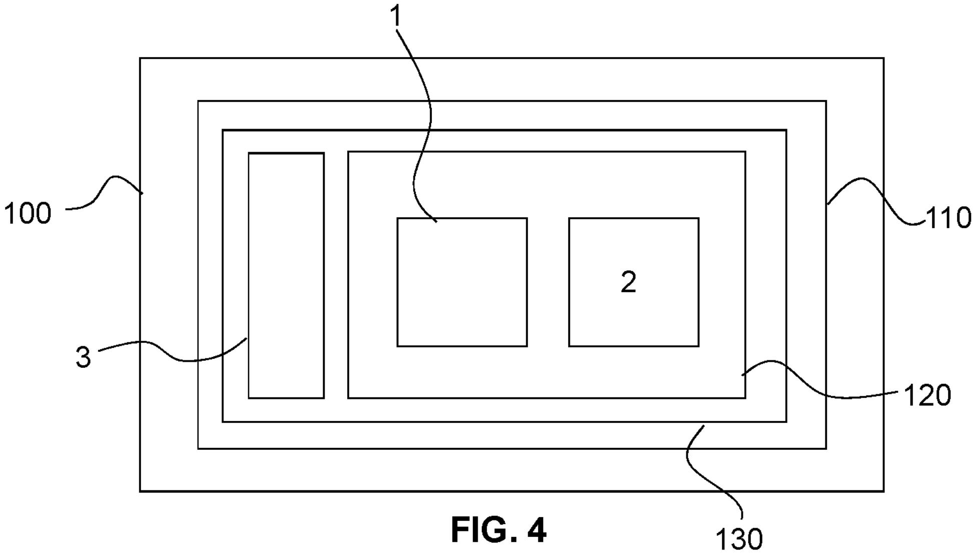
FIG. 4 shows a timepiece comprising a horological movement provided with at least one assembly including an elastic retaining member-timepiece component unit attached to a support element, according to one embodiment of the invention.

In these embodiments, this retaining member 1 may be included within an elastic retaining member-timepiece component unit 120 that can be seen in FIG. 4 and that is provided in order to be arranged in a horological movement 110 of a timepiece 100. Such a unit 120 may be one piece made of a so-called "fragile" material preferably a micro-machinable material. Such a material may comprise silicon, quartz, corundum or also ceramic.

It will be noted that in a variant of this unit, only the elastic retaining member 1 may be made of such a so-called "fragile" material, the timepiece component 2 then being manufactured in another material.

This unit 120 may form part of an assembly 130 for the horological movement 110, by being attached to the support element 3 for example by elastic clamping. It will be noted that this assembly 130 has been invented for applications in the horological field. However, the invention may be implemented perfectly in other fields such as aeronautics, jewelry, or also automobile.

Such a retaining member 1 comprises an upper face and a lower face 12 preferably flat respectively included in first and second planes P1 and P2, as well as outer and inner structures 4*a*, 4*b*. These outer and inner structures 4*a*, 4*b* respectively comprise outer and inner peripheral walls of this retaining member 1 and have different shapes. More specifically, concerning the outer structure 4*a*, it may have a globally hexagonal shape comprising portions having convex shapes. Each of these portions is included within a connecting zone 9 connecting an elastic arm to a rigid arm 6. The elastic 7 and rigid arms 6 as each being a part of elongated shape that interconnects portions of the retaining member 1. In other words, a rigid arm or an elastic arm extends longitudinally between two connecting zones 9. In this context, when we speak of elastic arms 7, the portions of the member 1 that are interconnected are the rigid arms 6, this connection being performed at the connecting zones 9. Similarly, when we speak of rigid arms 6, the portions of the member 1 that are interconnected are the elastic arms 7, this connection being performed obviously at the connecting zones 9. This outer structure 4*a* is particularly intended to be connected to the timepiece component 2 by means of at least one attachment point 11 arranged in the outer peripheral wall of the retaining member 1. As regards the inner structure 4*b*, it has a non-triangular shape. This inner structure 4*b* that comprises the inner peripheral wall of this retaining member 1, contributes to defining an opening 5 of such a retaining member 1 into which the support element 3 is intended to be inserted. This opening 5 defines a volume in the retaining member 1 that is smaller than that of a connecting portion of an end of the support element 3 that is provided in order to be arranged here. It will be noted that this connecting portion comprises all or part of the portions 10 defined on the peripheral wall 13 of the support element 3 and that are provided particularly in order to cooperate with contact zones 8 of the rigid arms 6.

This retaining member 1 comprises the rigid arms 6 and elastic arms 7 interconnecting the outer and inner structures 4*a*, 4*b*. It will be noted that this retaining member 1 comprises as many rigid arms 6 as elastic arms 7. The rigid arms 6 are here non-deformable or almost non-deformable and play a role of elements for stiffening the retaining member 1. Concerning the elastic arms 7, they are capable of deforming mainly during tension but likewise during torsion. These rigid arms 6 and these elastic arms 7 are defined or also distributed successively and alternately in this retaining member 1. In other words, these rigid arms 6 are interconnected by said elastic arms 7. More specifically, each elastic arm 7 is connected in the two opposite ends thereof at connecting zones 9 with two different rigid arms 6. Such rigid and elastic arms 6, 7 comprise in a non-limiting and non-exhaustive manner:

- internal faces included in the inner structure 4*b* and that contribute to defining together the inner peripheral wall of the retaining member 1 and therefore also the opening 5 of this retaining member 1, and
- external faces included in the outer structure 4*a* and that define together the outer peripheral wall of this retaining member 1.

It will be noted that the internal faces of the elastic arms 7 are essentially flat and the internal faces of the rigid arms 6 may not be flat by being for example undulated. In this context, the internal face of each rigid arm 6 may comprise at least one contact zone 8. The contact zone 8 may be rounded or convex or also flat. Alternatively, such an internal face of the rigid arm 6 may comprise two contact zones 8 preferably flat.

These rigid and elastic arms 6, 7 interconnect the outer and inner structures 4*a*, 4*b* by each comprising for that matter a portion of these outer and inner structures 4*a*, 4*b*. In this retaining member 1, these rigid and elastic arms 6, 7 essentially make it possible to perform elastic clamping of the support element 3 in the opening 5 provided in this retaining member 1 that is defined by the inner structure 4*b* and in particular by the inner peripheral wall of this retaining member 1.

As we have seen, these rigid arms 6 therefore comprise the only contact zones 8 of the retaining member 1 with the support element 3 that may be defined in all or part of the internal faces of these rigid arms 6. Each contact zone 8 otherwise known as "contact interface" is provided in order to cooperate with a peripheral wall 13 of the connecting portion of the support element 3 in particular with the corresponding portion defined in this peripheral wall 13 of the support element 3. In this context, the retaining member 1 then comprises three contact zones 8 that contribute to performing a precise centring of the timepiece component 2, for example a balance-spring, in the horological movement 110. In this retaining member 1, each rigid arm 6 has a volume of material that is substantially greater or strictly greater than the volume of material constituting each elastic arm 7. It is clearly understood that the more material there is the more rigid the arm is. In addition, it will be noted that the elasticity or the rigidity of an arm in this retaining member 1 is defined relative to the contact zones 8 of this member 1 more specifically relative to the intensity of the deformation of these rigid or elastic arms during the application of a force on these contact zones 8. Indeed, it will be noted that the outer and inner structures 4*a*, 4*b*, and in particular the inner and outer peripheral walls, are separated from one another in this retaining member 1 by a variable gap E that then changes depending on whether these structures are included for example in a rigid arm 6 or also an elastic arm 7. Indeed, this gap E is a maximum gap E1 when it is defined between portions of the inner and outer peripheral walls included in each rigid arm 6, namely the maximum gap E1 present between the internal and external faces of this rigid arm 6. In particular, for each rigid arm 6, this maximum gap E1 is defined between each contact zone 8 included in the internal face of the inner peripheral wall and a portion of the outer peripheral wall of this rigid arm 6. Moreover, this gap E is a minimal gap E2 when it is defined between portions of the outer and inner peripheral walls included in the elastic arms 7, namely the minimal gap E2 present between the internal and external faces of this elastic arm 7.

Therefore, it is understood here that each elastic arm 7 has a transverse section that is smaller than a transverse section of each rigid arm 6. In other words, the transverse section of each elastic arm 7 has a surface area that is smaller than a surface area of the transverse section of each rigid arm 6. It will be noted that the transverse section of the elastic arm 7 is constant or substantially constant in the entire body of this elastic arm 7 whereas the transverse section of the rigid arm 6 is inconstant/variable in the entire body of this rigid arm 6. In addition, it will be seen that:

- the transverse section of each rigid arm 6 is preferably a solid or partially solid section that is perpendicular to the longitudinal direction in which the body of this rigid arm 6 extends, and
- the transverse section of each elastic arm 7 is preferably a solid or partially solid section that is perpendicular to the longitudinal direction in which the body of this elastic arm 7 extends, and Such a configuration of rigid and elastic arms 6, 7 makes it possible for the retaining member 1 to store a larger amount of elastic energy for the same clamping in comparison with the retaining members of the prior art. Such an amount of elastic energy stored in the retaining member 1 then makes it possible to obtain a greater resistance torque of the retaining member of the support element 3 in the assembly 130 of the retaining member—timepiece component unit 120 with this support element 3. In other words, such an excess of elastic energy stored in the retaining member 1 therefore increases the resistance torque and permits optimum elastic clamping. In addition, it will be noted that such a configuration of the retaining member 1 makes it possible to store elastic energy ratios that are 6 to 8 times greater than those of the retaining members of the prior art.

Figure 5:
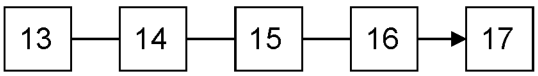
FIG. 5 shows a method for producing such an assembly of an elastic retaining member-timepiece component unit with a support element.

With reference to FIG. 5, the invention likewise relates to a method for producing the assembly 130 of the elastic retaining member-timepiece component unit 120 with the support element 3. This method comprises a step of inserting 13 the support element 3 into the opening 5 of the retaining member 1. During this step 13, the end of the support element is presented at the entrance of the opening 5 defined in the lower face 12 of the retaining member 1 in anticipation of the introduction of the connecting portion of this support element 3 into the volume defined in this opening 5. This step 13 comprises a sub-step of elastically deforming 14 the retaining member 1 particularly of a central zone of this retaining member 1 comprising said opening 5 resulting in the application of a contact force on the contact zones 8 of the rigid arms 6 by the portions 10 of the peripheral wall 13 of the connecting portion of the support element 3. This elastic deformation of the central zone in fact causes a deformation of the lower face 12 of the retaining member 1 that then has an essentially concave shape particularly at one portion of this face 12 included in the central zone of the retaining member 1. In other words, when the central zone of the retaining member 1 is deformed the lower face 12 thereof is no longer flat and is then no longer entirely included in the second plane P2.

As previously mentioned, this elastic deformation of the retaining member 1 results in the application of the contact force on the contact zones 8 of the rigid arms 6 by the portions 10 of the peripheral wall 13 of the support element 3. Such a deformation sub-step 14 comprises a phase of moving 15 the rigid arms 6 under the action of the contact force that is applied thereto. Such a movement of the rigid arms 6 is performed according to a direction included between a radial direction B1 in relation to a central axis common to the support element 3 and to the retaining member 1, and a direction B2 combined with this central axis C. It will be noted that this direction B2 is perpendicular to the direction B1 and is oriented in a way defined from the lower face 12 to the upper face. The contact force is preferably perpendicular or substantially perpendicular to each contact zone 8. During the sequence of this phase 12, the rigid arms 6 thus moving under the action of this contact force, cause a double elastic deformation of the elastic arms 7.

A first deformation otherwise known as "elastic torsional deformation" of these elastic arms 7. During this torsional deformation, each elastic arm 7 is driven in the two ends thereof in the same direction of rotation B4 by the rigid arms 6 in movement to which such ends are connected. It will be seen that only a portion of the body of these elastic arms 7 is torsionally deformable here the ends of these arms 7. Such a first deformation contributes particularly to improving the insertion of the support element 3 into the opening 5 of the retaining member 1 by contributing to avoiding any breakage of the retaining member 1 and/or any appearance of a crack in this member 1 during the assembly thereof with the support element 3.

A second deformation otherwise known as "tensile deformation" or also "elastic extension deformation" of the elastic arms 7. During this extension deformation, each elastic arm 7 is pulled in the two ends thereof in the longitudinal direction B3 in opposite ways by the rigid arms 6 in movement to which such ends are connected. Such a second deformation contributes particularly in that the retaining member 1 stores a large amount of elastic energy.

This double elastic deformation of the elastic arms 7 may be performed simultaneously or substantially simultaneously, or also successively or substantially successively. It will be noted within the scope of the implementation of the deformation phase that when this double elastic deformation is performed successively or substantially successively, the first deformation is then carried out before the second deformation.

This method subsequently comprises a step of attaching 16 the retaining member 1 to the support element 3. Such an attachment step 16 comprises a sub-step of performing 17 radial elastic clamping of the retaining member 1 on the support element 3. It is therefore understood that in such a state of constraint, the retaining member 1 stores a large amount of elastic energy that helps to give it a consequential resistance torque permitting particularly optimum colleting by elastic clamping.

The invention claimed is:

1. An elastic retaining member for attaching a timepiece component to a support element, the elastic retaining member comprising:

an opening into which said support element is configured to be inserted;

rigid arms; and elastic arms defined between connecting zones to ensure elastic clamping of the support element in the opening, wherein the rigid arms are provided with the only contact zones of the retaining member with the support element, wherein the rigid arms and the elastic arms are arranged in the retaining member successively and alternately, wherein an inner peripheral surface of each contact zone of the rigid arms is configured to face in a direction of the support element, each inner peripheral surface is comprised of a plurality of contact surfaces configured to engage the support element, wherein each of the contact surfaces has a planar shape, wherein the elastic retaining member comprises an attachment point with the timepiece component, the attachment point being positioned along an outer circumference of the elastic retaining member, and wherein a first rigid arm of the rigid arms is positioned immediately adjacent the attachment point on a first side of the attachment point along the outer circumference, and a first flexible arm of the flexible arms is positioned immediately adjacent the attachment point on a second side of the attachment point along the outer circumference opposite the first side such that the attachment point is positioned between the first rigid arm and the first flexible arm along the outer circumference of the elastic retaining member.

2. The elastic retaining member according to claim 1, wherein the retaining member comprises an outer structure configured to be connected to said timepiece component and an inner structure defining the opening into which the support element is configured to be inserted, wherein the retaining member comprises the rigid arms and the elastic arms interconnecting the outer and inner structures, the rigid arms being interconnected by said elastic arms.

3. The elastic retaining member according to claim 1, wherein the elastic retaining member includes comprises as many rigid arms as elastic arms.

4. The elastic retaining member according to claim 1, wherein each rigid arm is connected at two opposite ends thereof to two different elastic arms.

5. The elastic retaining member according to claim 1, wherein each rigid arm has a volume of material greater than the volume of material constituting each elastic arm.

6. The elastic retaining member according to claim 1, wherein each elastic arm has a transverse section that is smaller than a transverse section of each rigid arm.

7. The elastic retaining member according to claim 1, wherein each elastic arm has a transverse section that is constant in the entire body of this elastic arm.

8. The elastic retaining member according to claim 2, wherein the outer and inner structures respectively comprise outer and inner peripheral walls of said retaining member.

9. The elastic retaining member according to claim 8, wherein the outer and inner peripheral walls are separated from one another according to a variable gap.

10. The elastic retaining member according to claim 9, wherein said gap is a maximum gap when it is defined between portions of outer and inner peripheral walls included in the rigid arms.

11. The elastic retaining member according to claim 9, wherein said gap is a maximum gap when it is defined between portions of the outer peripheral wall and the contact surfaces defined in the inner peripheral wall included in the rigid arm.

12. The elastic retaining member according to claim 9, wherein said gap is a minimum gap when it is defined between portions of the outer and inner peripheral walls included in the elastic arms.

13. The elastic retaining member according to claim 2, wherein the outer and inner structures have different shapes.

14. The elastic retaining member according to claim 1, wherein the elastic retaining member is a collet for attaching the timepiece component to a support element such as a balance staff.

15. The elastic retaining member according to claim 1, wherein the elastic retaining member is made of a silicon-based material.

16. An elastic retaining member-timepiece component unit for a horological movement of a timepiece comprising a retaining member according to claim 1.

17. The unit according to claim 16, wherein the unit is one piece.

18. An assembly for a horological movement of a timepiece comprising the elastic retaining member-timepiece unit according to claim 16, said unit being attached to the support element.

19. A method for producing an assembly of an elastic retaining member-timepiece component unit with a support element according to claim 18, comprising:

a step of inserting the support element into the opening of the elastic retaining member of said unit, said step comprising a sub-step of elastically deforming the elastic retaining member provided with a phase of moving the rigid arms of the elastic retaining member inducing a double elastic deformation of the elastic arms of this elastic retaining member, and a step of attaching the retaining member to the support element comprising a sub-step of applying by the rigid arms of the elastic retaining member a resistance torque on said support element.

20. The horological movement comprising at least one assembly according to claim 18.

21. A timepiece comprising a horological movement according to claim 20.

* * * * *